E. Baily,
Wood Planing Machine.
No 83,684. Patented Nov. 3, 1868.
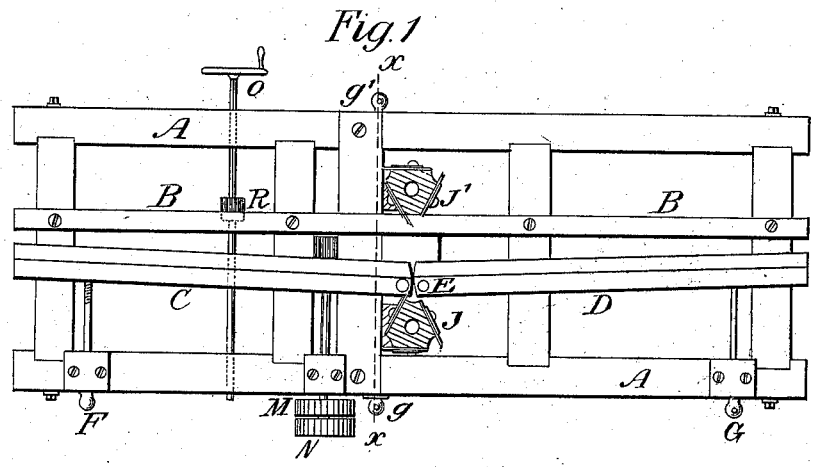
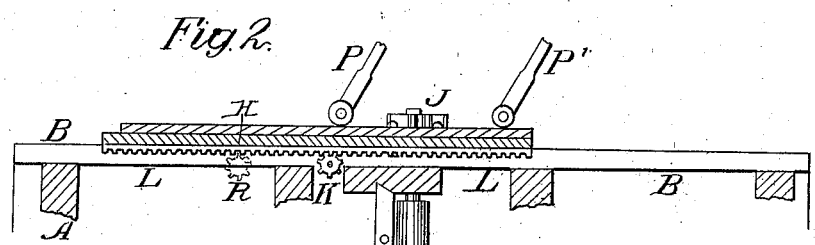
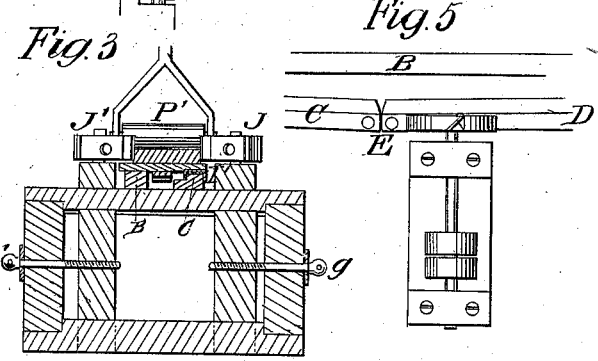
Attest
J. A. Layman
W. B. Deming
Inventor
Ezra Baily
By Knight Bro
Attys

United States Patent Office.

EZRA BAILY, OF CINCINNATI, OHIO, ASSIGNOR TO HIMSELF AND JOSEPH PARKER, OF COVINGTON, KENTUCKY.

Letters Patent No. 83,684, dated November 3, 1868.

IMPROVEMENT IN PLANK AND TIMBER-DRESSER.

The Schedule referred to in these Letters Patent and making part of the same.

*To whom it may concern:*

Be it known that I, EZRA BAILY, of Cincinnati, Hamilton county, State of Ohio, have invented a new and useful Plank and Timber-Dressing Machine, of which the following is a full, clear, and exact description, reference being had to the accompanying drawings, making part of this specification.

My invention relates to the class of devices employed for dressing the edges of joists, planks, decking, and other timber, either to a straight or to any curved or cambered form desired.

And my invention consists in a certain arrangement of paired and rotary cutters, upon vertical and stationary but adjustable axes, in combination with a bed or carriage, which is guided in a circular arc, of any desired curvature, by a pair of hinged and adjustable ways or tracks, as hereinafter described.

Figure 1 is a top view of a machine embodying my invention, the carriage being removed.

Figure 2 is a longitudinal section thereof.

Figure 3 is a transverse section at the line $x$–$x$ of the carriage and ways to an enlarged scale.

Figures 4, 5, and 6 are, respectively, a side, top, and end elevation, of a disk-cutter, as used in this connection.

The frame A supports a pair of tracks or rails, of which one, B, is made fast to the frame throughout its length, while the other one or guide-rail is in two pieces, C and D, connected to each other and to the frame by a hinge, E.

From the hinge E the parts C and D are made to converge more or less toward the rail B, or, when desired, are brought parallel thereto by means of set-screws F and G.

The stuff or timber to be dressed is supported upon a carriage, H, which simply rests upon the rail B, and which is held to the guide-rail C D by jaws I I', which are firmly fastened to the under side of the carriage H, near its ends.

J J' are a pair of cutter-heads, on vertical or nearly vertical shafts, and adjustable laterally to the width of the stuff, by means of screws $g\ g'$, but stationary while in operation.

The two members, C D, of the guide-rail, being adjusted to a greater or less angle, with respect to each other, by the set-screws F and G, compel the carriage to move in a circular arc of greater or less curvature, as desired.

The carriage may be driven by a pinion, K, gearing into a rack, L, on the under side of the carriage, and provided with customary fast and loose driving-pulleys, M N.

A rapid backward stroke of the carriage may be effected by a friction-wheel, or otherwise.

O is a hand-wheel or crank of a pinion, R, which, after the dressing has been effected, enables the attendant to run the carriage slightly forward or backward for trimming the ends of the timber to a definite length, or other purpose.

By drawing the shaft of the pinion R toward the operator, said pinion may be ungeared from the rack. This hand-wheel and pinion may, however, be omitted, if preferred.

The stuff is held to the carriage by means of suitable pressure-rollers P P'.

Disk-cutter heads, V, as in figs. 4, 5, and 6, may be substituted for the cutter-heads J J', especially for working square logs, or other large timbers.

The term "stationary heads" in this specification and claim, refers to rotary cutter-heads, whose axes of rotation, although capable of lateral adjustment, remain at rest while at work.

I am aware that the edges of joists have been dressed to a given curve or camber by means of cutter-heads, to which a lateral motion, while in operation, has been imparted by means of a curved guide or pattern, and, therefore, make no claim to such.

I am also aware that a hinged guide-way or track has been proposed in conjunction with one or more saws, and I therefore disclaim novelty in such a guide-way, other than in the special combination with my cutter-heads J J'.

I claim as new, and of my invention—

The adjustable hinged rails C D, jaws I I', carriage H, and adjustable heads J J', herein described, arranged to operate for the purposes set forth.

In testimony of which invention, I hereunto set my hand.

EZRA BAILY.

Witnesses:
GEO. H. KNIGHT,
JAMES H. LAYMAN.